(12) United States Patent
Fogg, IV

(10) Patent No.: US 10,441,105 B1
(45) Date of Patent: *Oct. 15, 2019

(54) PORTABLE DRINKING VESSEL AND AUTOMATIC BEVERAGE BREWING DEVICE

(71) Applicant: Leslie William Fogg, IV, Milton, VT (US)

(72) Inventor: Leslie William Fogg, IV, Milton, VT (US)

( * ) Notice: Subject to any disclaimer, the term of this patent is extended or adjusted under 35 U.S.C. 154(b) by 1241 days.

This patent is subject to a terminal disclaimer.

(21) Appl. No.: 14/047,927

(22) Filed: Oct. 7, 2013

Related U.S. Application Data

(63) Continuation-in-part of application No. 12/924,346, filed on Sep. 24, 2010, now Pat. No. 8,584,576, and a continuation-in-part of application No. 12/586,773, filed on Sep. 28, 2009, now abandoned.

(51) Int. Cl.
  *A47J 31/00* (2006.01)
(52) U.S. Cl.
  CPC .................. *A47J 31/005* (2013.01)
(58) Field of Classification Search
  CPC .......... A47J 31/20; A47J 31/446; A47J 31/48; A47J 27/21083; A47J 27/21091; A47J 31/002; A47J 31/306; A47J 31/4439; A47J 31/4496; A47J 31/52; A47J 36/2483; A47J 47/01; A47J 27/2105; A47J 27/21166; A47J 31/10; A47J 31/005; A47J 31/057; A47J 31/0605; A47J 31/106; A47J 31/4432; A47J 31/50; G01F 11/023; G01F 11/028; G05D 23/1909; G05D 23/24; H05B 1/0269; A47G 19/14; A47G 2019/122

USPC .................. 99/279, 280–282, 295–296, 306, 99/316–319, 320–323, 308, 309, 288, 99/275; 426/665, 403, 77, 82, 234, 431, 426/433, 435

See application file for complete search history.

(56) References Cited

U.S. PATENT DOCUMENTS

| | | | | |
|---|---|---|---|---|
| 2,180,655 A | * | 11/1939 | Abbate | A47J 31/103 392/479 |
| 2,194,820 A | * | 3/1940 | Connell | A47J 27/004 219/433 |
| 3,074,865 A | * | 1/1963 | Gaysowski | B01D 61/48 204/196.37 |

(Continued)

FOREIGN PATENT DOCUMENTS

WO 2008049163 A1 5/2008

*Primary Examiner* — Tu B Hoang
*Assistant Examiner* — Masahiko Muranami
(74) *Attorney, Agent, or Firm* — Invention To Patent Services; Alex Hobson

(57) ABSTRACT

A portable and automatic beverage brewing device configured in a unitary drinking vessel provides for an integral brewing device that is also a drinking vessel. The drinking vessel is configured with a pump and one or more heating elements to heat the liquid and pump it from a liquid container to a receptacle for receiving infusible material, such as coffee or tea, for example. A pump may be configured in the base of the unitary drinking vessel and a tube may extend up between the exterior of the liquid container and the exterior wall of the drinking vessel, to the receptacle. The tube may be spiraled around the liquid container and a heating element may be configured around on in contact with the tube within the inner wall space.

16 Claims, 19 Drawing Sheets

(56) References Cited

U.S. PATENT DOCUMENTS

| | | | | |
|---|---|---|---|---|
| 4,095,090 | A | * | 6/1978 | Pianezza ............ A47G 19/2288 |
| | | | | 219/435 |
| 4,309,940 | A | * | 1/1982 | Lowerre, Jr. ....... A47J 31/0573 |
| | | | | 99/281 |
| 4,980,539 | A | * | 12/1990 | Walton ................ A47J 36/2461 |
| | | | | 219/386 |
| 5,027,696 | A | | 7/1991 | Antonini |
| 5,868,062 | A | * | 2/1999 | Enomoto .............. A47J 31/002 |
| | | | | 99/282 |
| 6,084,216 | A | | 7/2000 | Slegt et al. |
| 6,135,010 | A | | 10/2000 | Husted et al. |
| 7,279,660 | B2 | | 10/2007 | Long et al. |
| 7,458,316 | B2 | | 12/2008 | Scelza |
| 7,487,713 | B2 | | 10/2009 | Magno |
| 2002/0096055 | A1 | * | 7/2002 | Heczko .................... A23L 2/00 |
| | | | | 99/323.3 |
| 2004/0206485 | A1 | * | 10/2004 | Ferraro .................. F24B 9/006 |
| | | | | 165/156 |
| 2005/0268790 | A1 | | 12/2005 | Baldacci |
| 2006/0021511 | A1 | | 2/2006 | Paasch et al. |
| 2008/0072767 | A1 | * | 3/2008 | Eden ................... A47J 31/0573 |
| | | | | 99/300 |
| 2008/0236401 | A1 | * | 10/2008 | Levin .................... A47J 31/005 |
| | | | | 99/295 |
| 2008/0274246 | A1 | | 11/2008 | Glucksman |
| 2008/0314255 | A1 | * | 12/2008 | Lee ....................... A47J 31/057 |
| | | | | 99/280 |
| 2009/0038685 | A1 | * | 2/2009 | Hill ....................... A45D 34/00 |
| | | | | 137/1 |

\* cited by examiner

PORTABLE DRINKING VESSEL AND AUTOMATIC BEVERAGE BREWING DEVICE

CROSS REFERENCE TO RELATED APPLICATIONS

The present application is a continuation-in-part application of U.S. patent application Ser. No. 12/924,346, filed on Sep. 24, 2010 currently allowed, which is a continuation-in-part of U.S. patent Ser. No. 12/586,773, filed Sep. 28, 2009 now abandoned; both of which are entitled Portable Automatic Beverage Brewing Drinking Vessel and are incorporated by reference herein in their entirety.

BACKGROUND OF THE INVENTION

Field of the Invention

The present invention relates to drinking vessels, and more specifically to an automatic portable beverage brewing drinking vessel for preparing a single serving of hot beverages such as coffee or tea.

Background

Portable single serving drinking vessels for hot beverages such as coffee or tea provide numerous advantages over multi-cup beverage brewing devices. The portable aspect of a single cup brewing drinking vessel allows for the preparation and enjoyment of a hot beverage in any environment, including but not limited to when traveling, camping, in the office, or when at home. In addition, the single serving portion of a portable single cup drinking vessel allows for the quick preparation of an amount of beverage that is appropriate for one person. Preparing a single serving in a multi-cup beverage brewing devices often results in the disposal of unused portions of the beverage, which equates to a waste of materials, energy to keep the beverage warm, and money. Another advantage of the portable single cup drinking vessel is cleanliness and the elimination of bacterial or viral exposure associated with the preparation and handling of most communal multi-beverage brewing devices.

There have been a number of approaches to meet the needs of a single serving beverage brewing and drinking vessel but there exists a need for an automatic, easy to use portable device. A simple single serving beverage brewing device is described in U.S. Pat. No. 5,478,586 issued to Conner, and describes generally a French press, or a device that holds a quantity of infusible material and has a means to plunge the infusible material through the liquid. This device fails to provide a means to heat the liquid, requires the user to deal with loose quantities of infusible material, and is not designed to drink from.

In U.S. Pat. No. 6,065,609 issued to Lake, a beverage brewing kit is described that comprises a cup and a cylindrical filter support for receiving infusible material. Again, this invention fails to provide a means to heat the liquid, and requires the user to deal with loose quantities of infusible material, has multiple large parts and is not portable.

Therefore, there exists a need for a portable automatic beverage brewing device that heats a liquid and automatically brews a beverage, and is designed to drink directly from.

SUMMARY OF THE INVENTION

The summary of the invention is provided as a general introduction to some of the embodiments of the invention, and is not intended to be limiting. Additional example embodiments including variations and alternative configurations of the invention are provided herein.

The invention is directed to a portable automatic beverage brewing drinking vessel having a receptacle for receiving a quantity of infusible material and a means for translating the infusible material into the liquid. In addition, the automatic beverage brewing dinking vessel heats cold liquid to a predetermined temperature before translating the infusible material into the liquid, providing a consistent beverage quality. In one embodiment, the interior wall of the automatic beverage brewing drinking vessel has channels that align with locating elements on the receptacle for receiving infusible material and guide the receptacle as it is translated into and out of the liquid.

Accordingly, it is a principle object and purpose of the present invention to provide a portable automatic beverage brewing drinking vessel for hot beverages such as coffee or tea.

It is a further object and purpose of the present invention to provide a portable automatic beverage brewing drinking vessel having a receptacle for receiving a quantity of infusible material.

It is further object and purpose of the present invention to provide a portable automatic beverage brewing drinking vessel having an automatic brewing program that heats the liquid to a predetermined temperature, and automatically translates the infusible material into the liquid.

It is a further object and purpose of the present invention to provide a portable automatic beverage drinking vessel having a means to transfer the liquid through the infusible material.

It is yet another object and purpose of the present invention to provide a portable automatic beverage drinking vessel designed for the consumption of a beverage directly there from.

Further objects of the invention will be apparent from the following drawings and detailed description, thereof.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
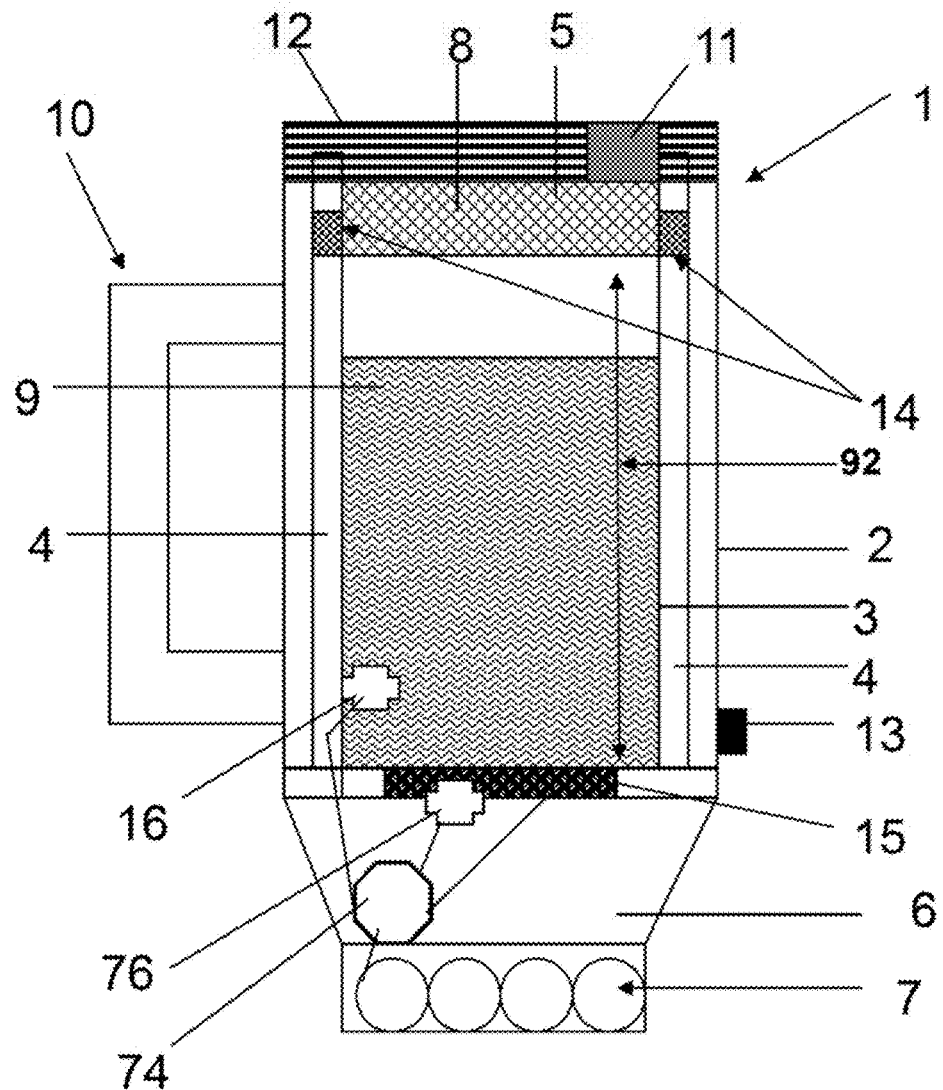

FIG. 1 is a cross sectional side view of the portable automatic beverage brewing drinking vessel having a receptacle for receiving infusible material, and batteries in the base.

Figure 2:
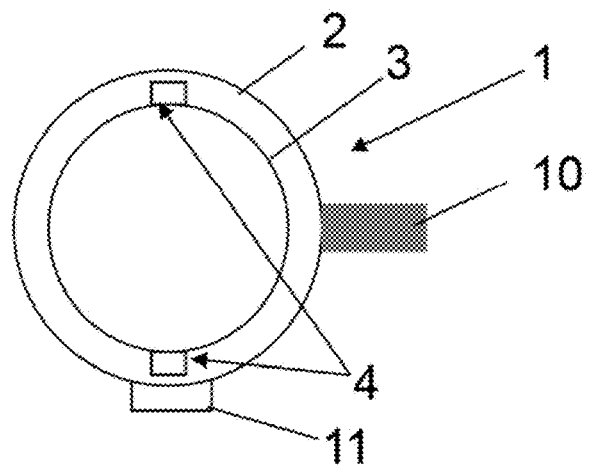

FIG. 2 is a top down view of the portable automatic beverage brewing drinking vessel.

Figure 3:
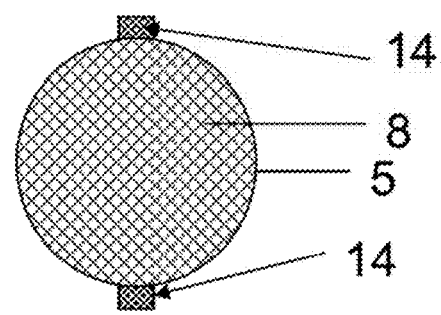

FIG. 3 is a top down view of the infusible material receptacle

Figure 4:
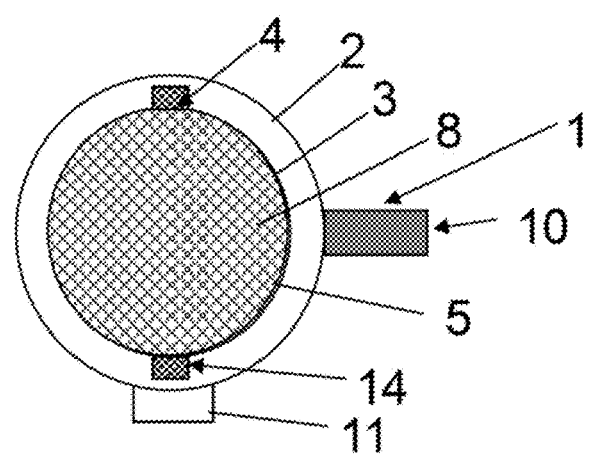

FIG. 4 is a top down view of the infusible material receptacle in the

Figure 5:
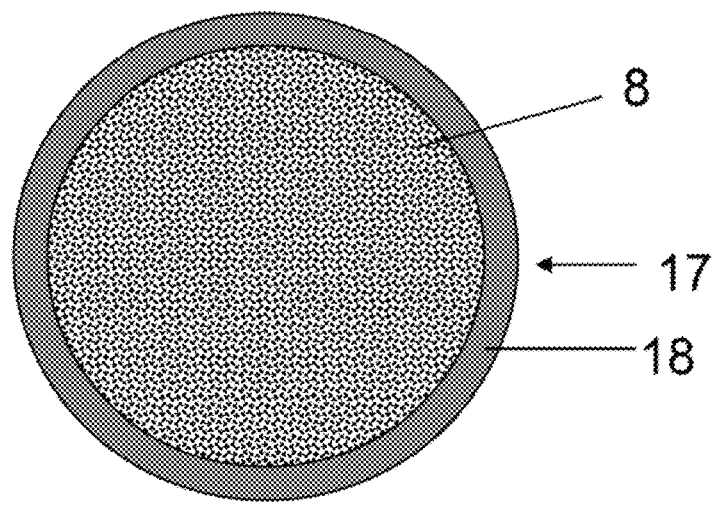
Figure 6:
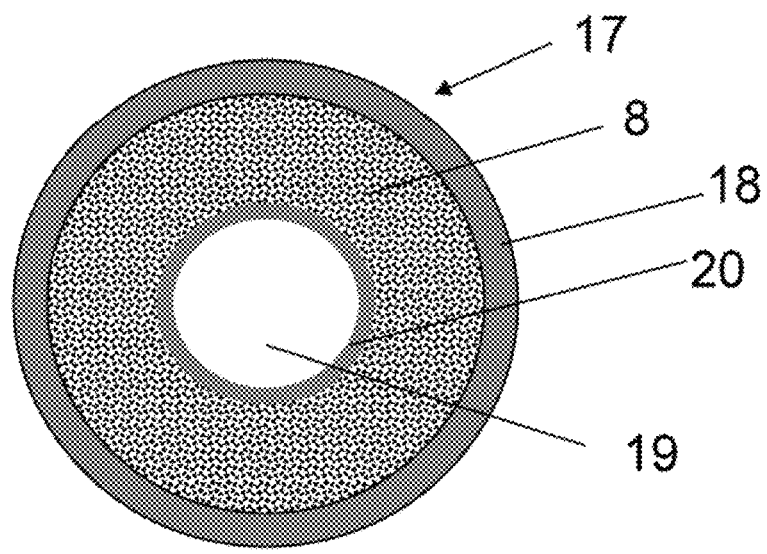
Figure 7:
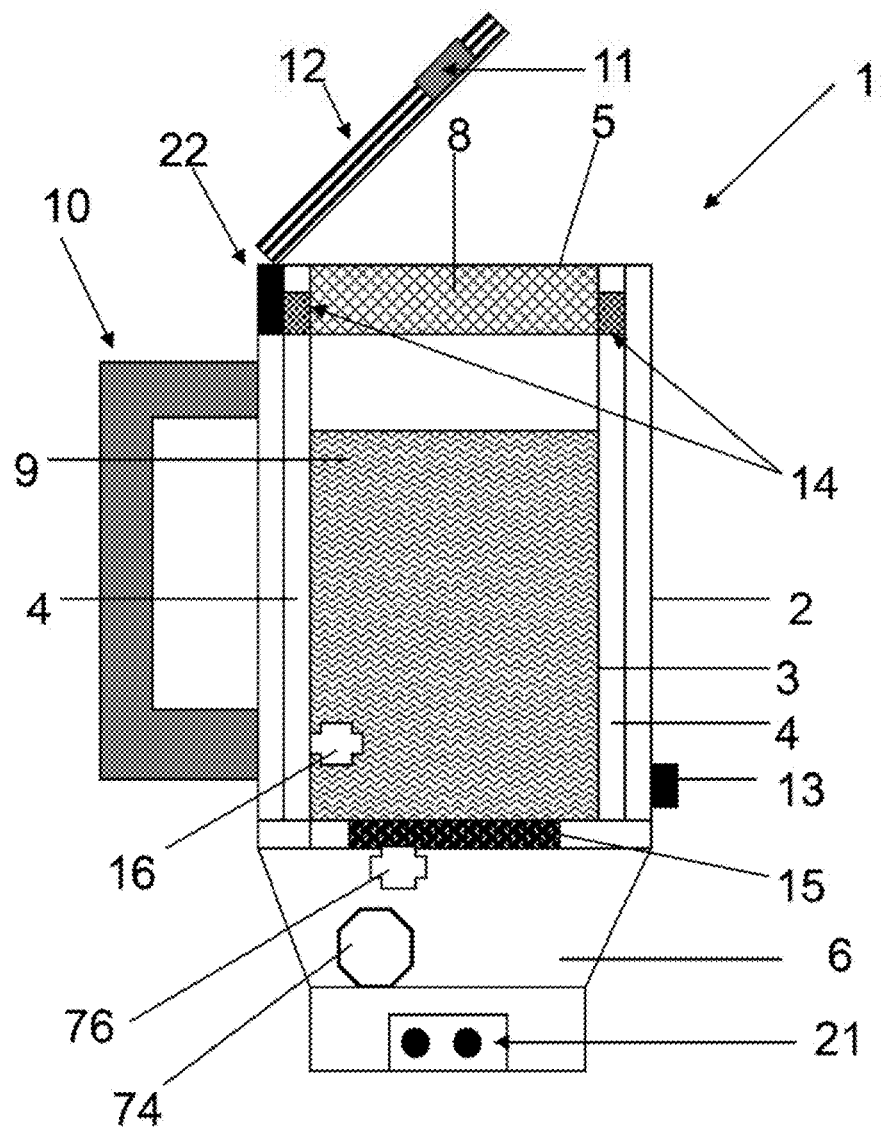
Figure 8:
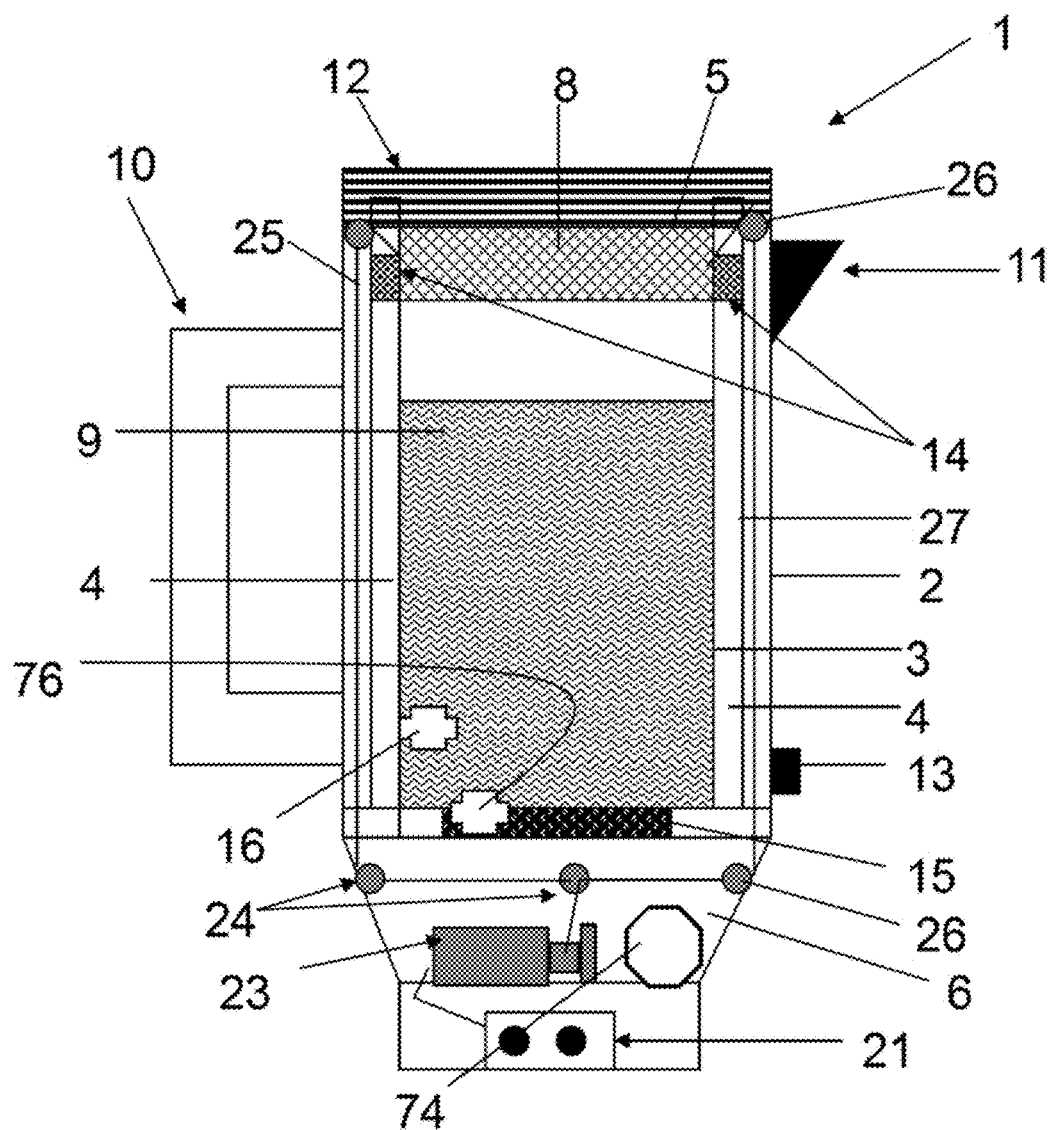
Figure 9:
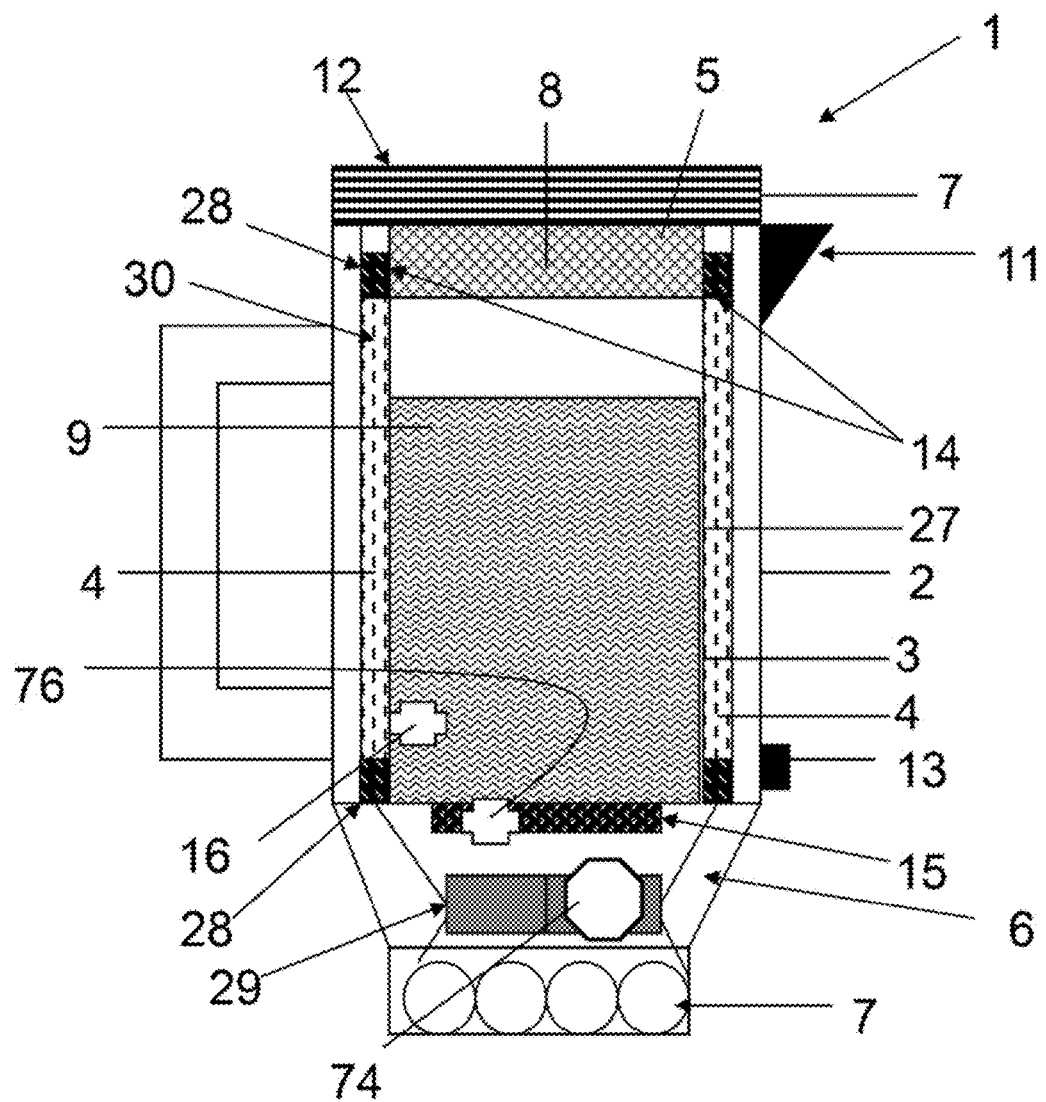
Figure 10A:
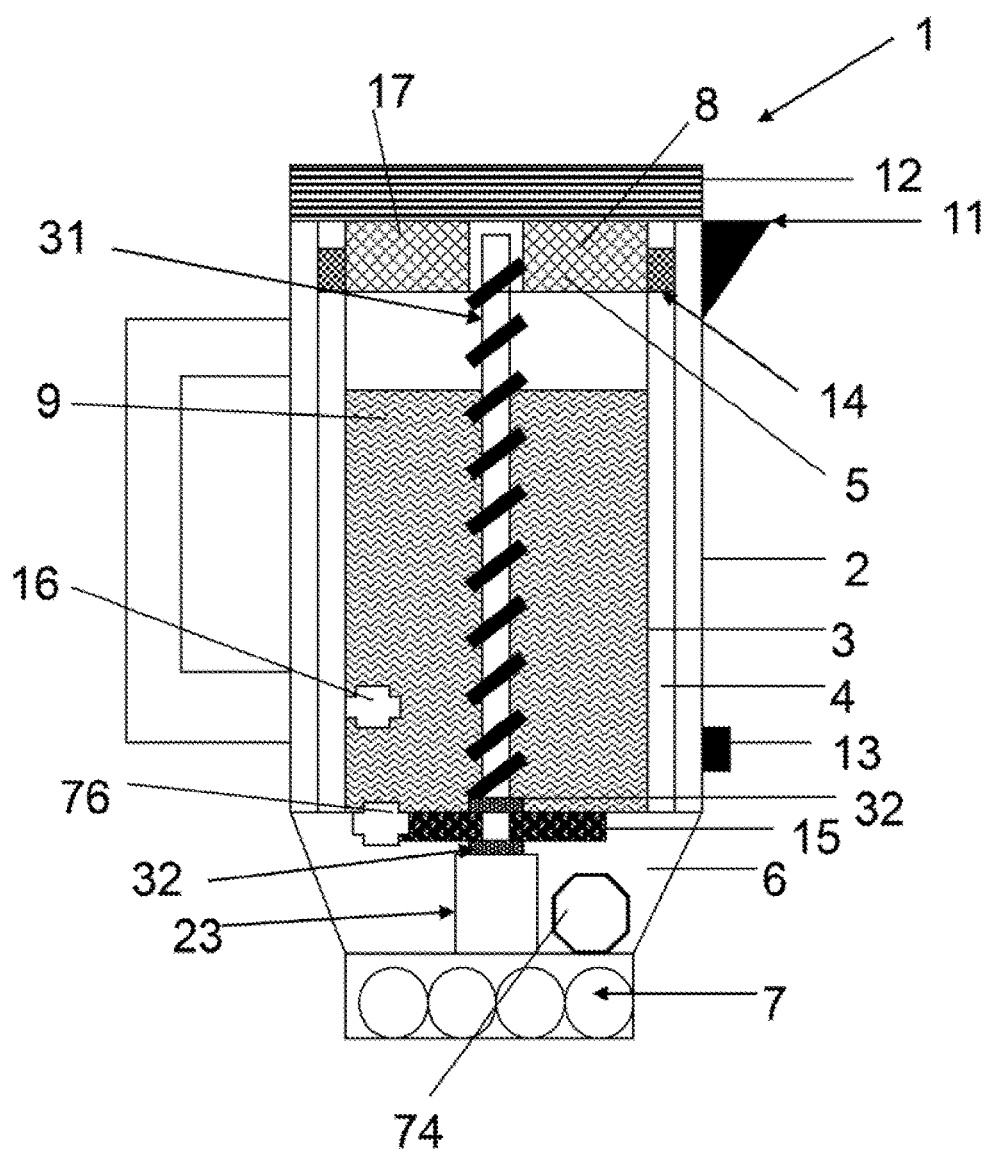

FIG. 5 is a top down view of an infusible material package having a sealed edge;

FIG. 6 is a top down view of a ring shaped infusible material package having an outer sealed edge and an inner sealed edge and an opening in the center;

FIG. 7 is a cross sectional side view of the portable automatic beverage brewing drinking vessel having a receptacle for receiving infusible material, and an electric port;

FIG. 8 is a cross sectional side view of the portable automatic beverage brewing drinking vessel having a receptacle for receiving infusible material, and an electric motor to translate the receptacle into and out of the liquid;

FIG. 9 is a cross sectional side view of the portable automatic beverage brewing drinking vessel having a receptacle for receiving infusible material, and electromagnets to translate the receptacle into and out of the liquid;

FIG. 10A is a cross sectional side view of the portable automatic beverage brewing drinking vessel having a receptacle for receiving infusible material, an electric motor connected to a threaded center shaft to translate the receptacle into and out of the liquid.

Figure 10B:
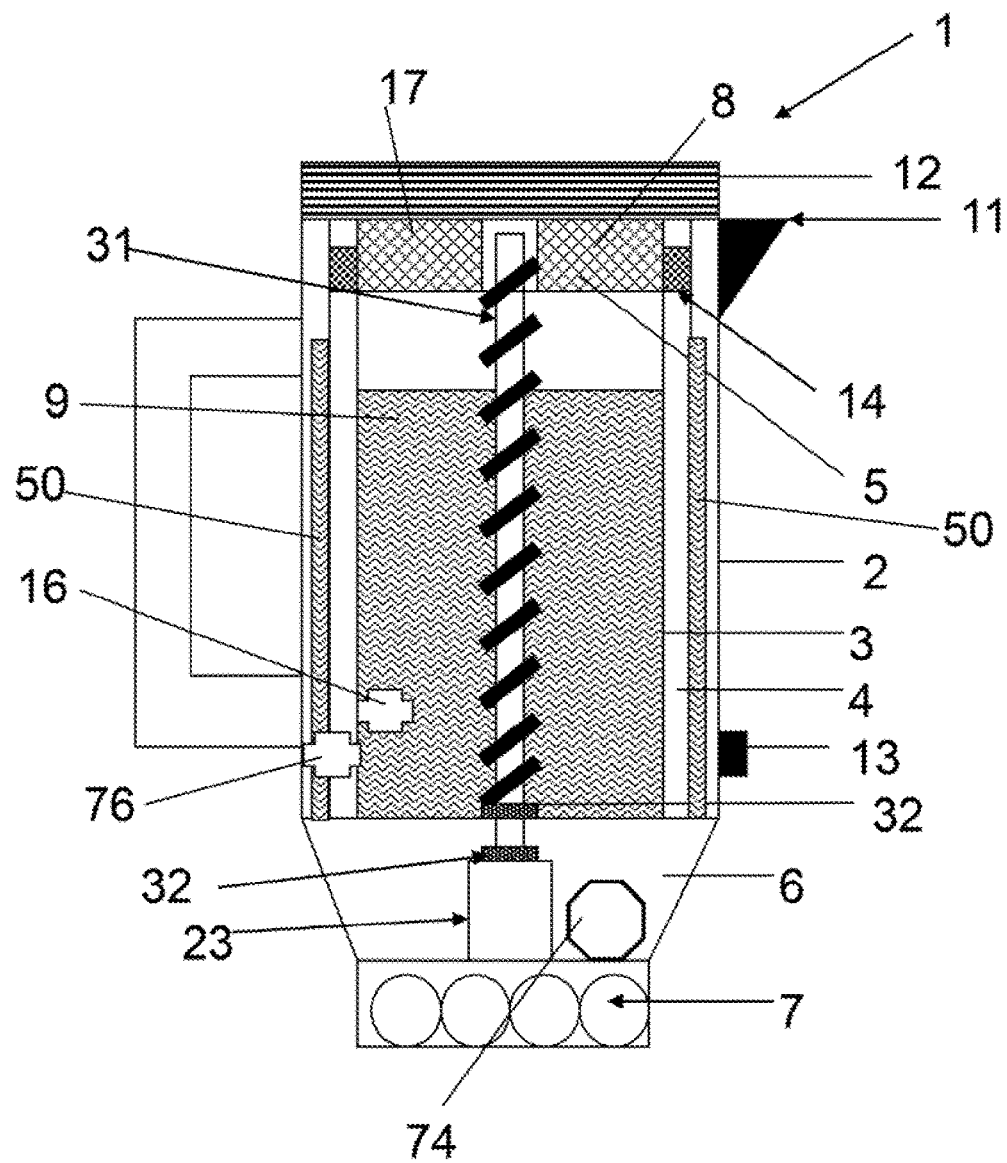

FIG. 10B is a cross sectional side view of the portable automatic beverage brewing drinking vessel having a flexible heating element, and a receptacle for receiving infusible material, an electric motor connected to a threaded center shaft to translate the receptacle into and out of the liquid.

Figure 11:
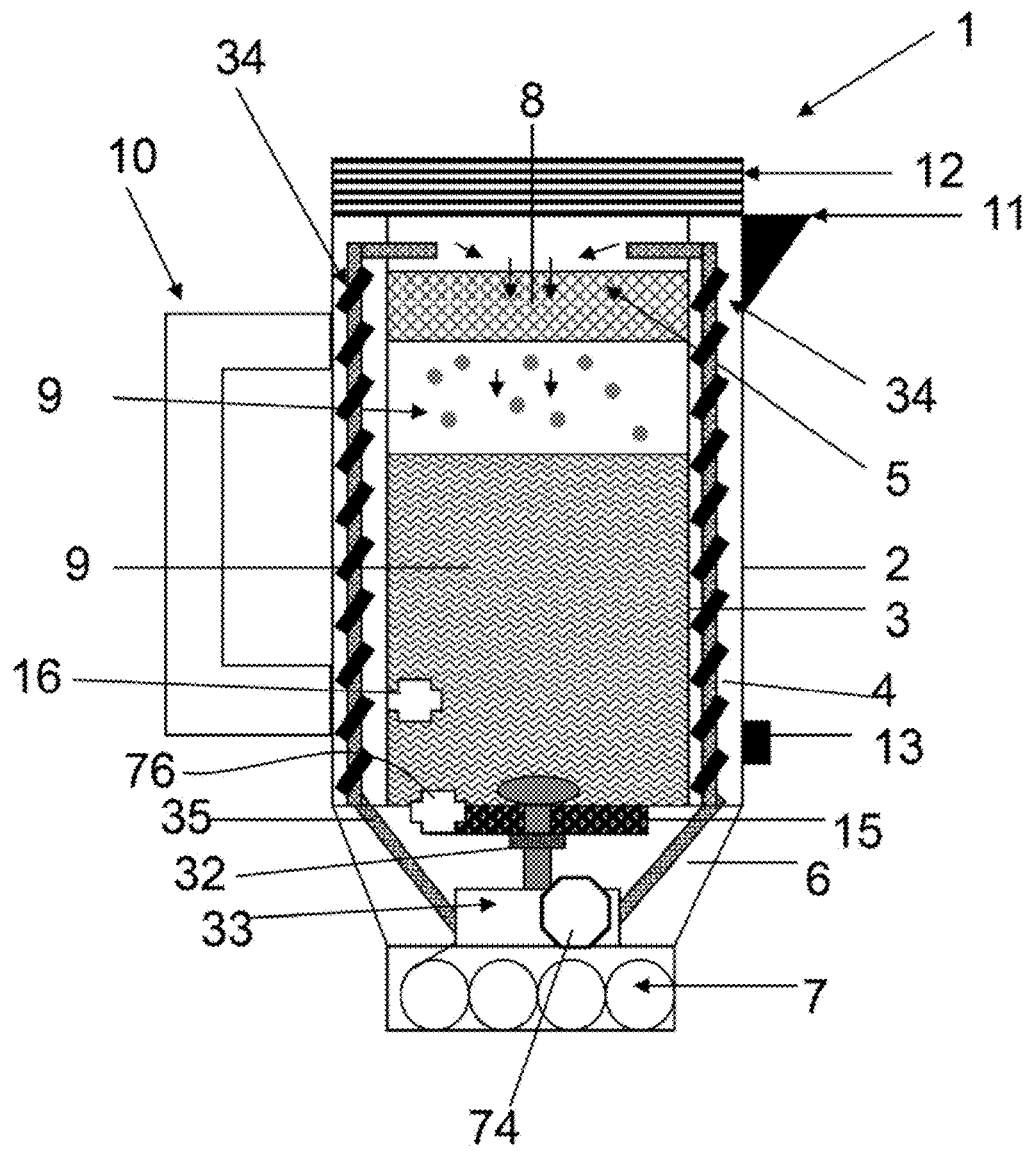

FIG. 11 is a cross sectional side view of the portable automatic beverage brewing drinking vessel having a receptacle for receiving infusible material, and pump to transfer liquid from the vessel through the infusible material.

Figure 12:
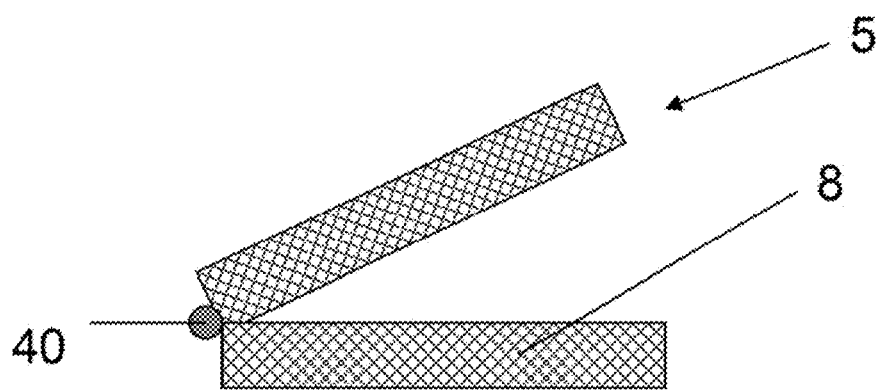

FIG. 12 is side view of a receptacle for receiving infusible material having a hinged element for opening.

Figure 13:
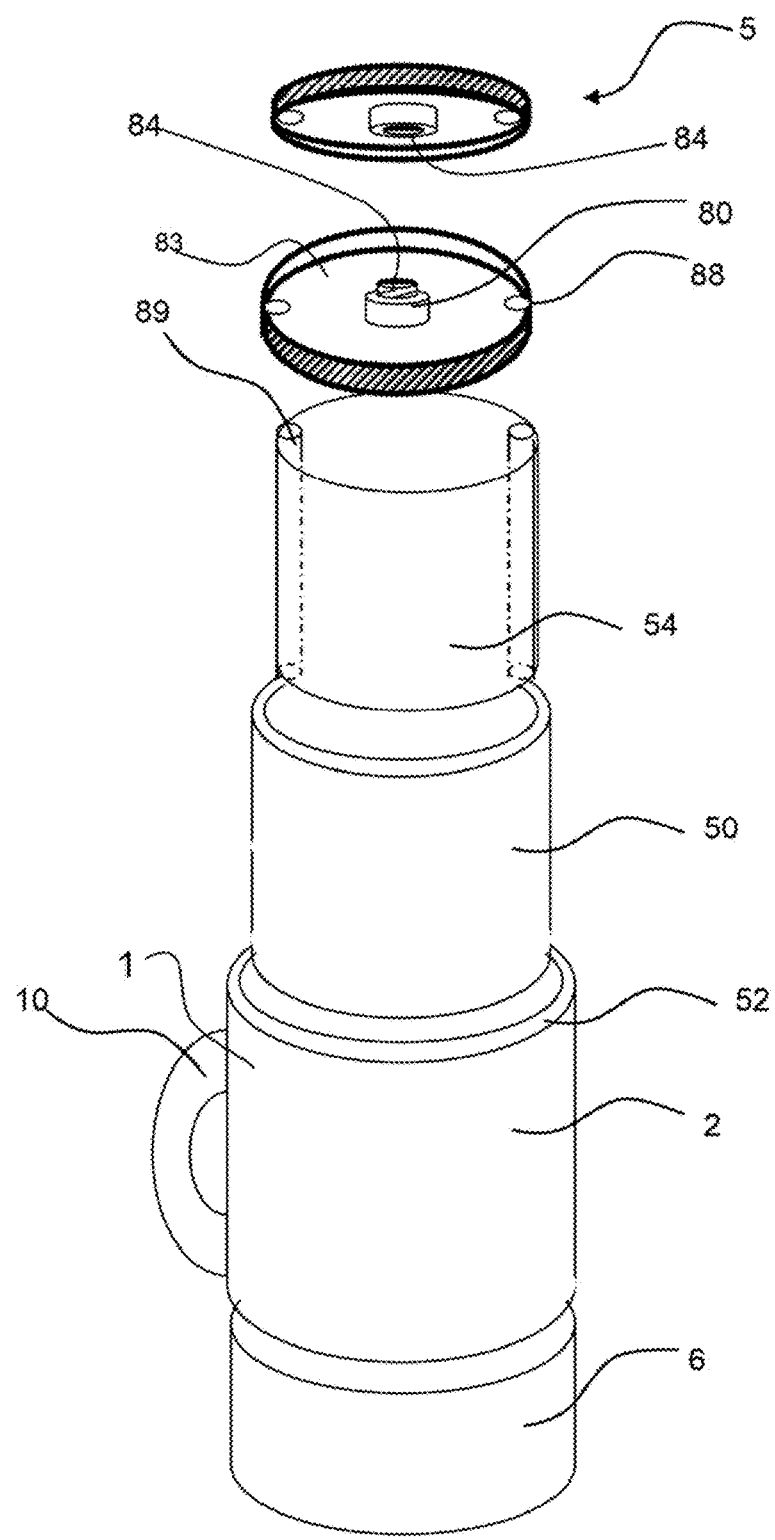

FIG. 13 is an isometric exploded view of a portable automatic beverage drinking vessel having a flexible heating element.

Figure 14A:
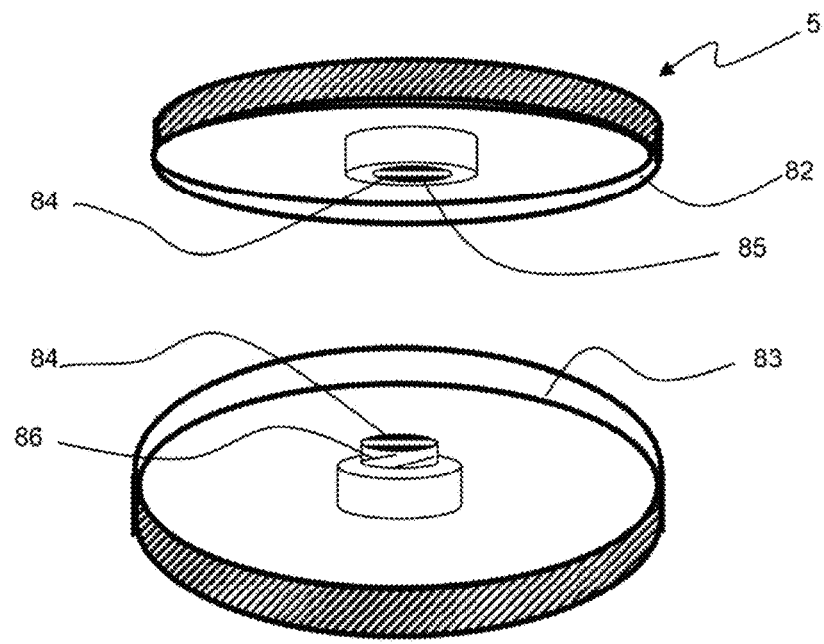

FIG. 14A is an isometric view depicting a receptacle for receiving infusible material.

Figure 14B:
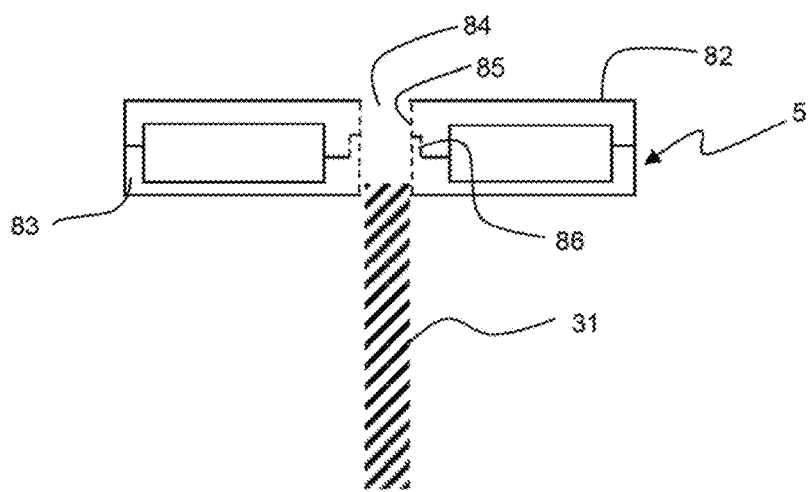
Figure 15:
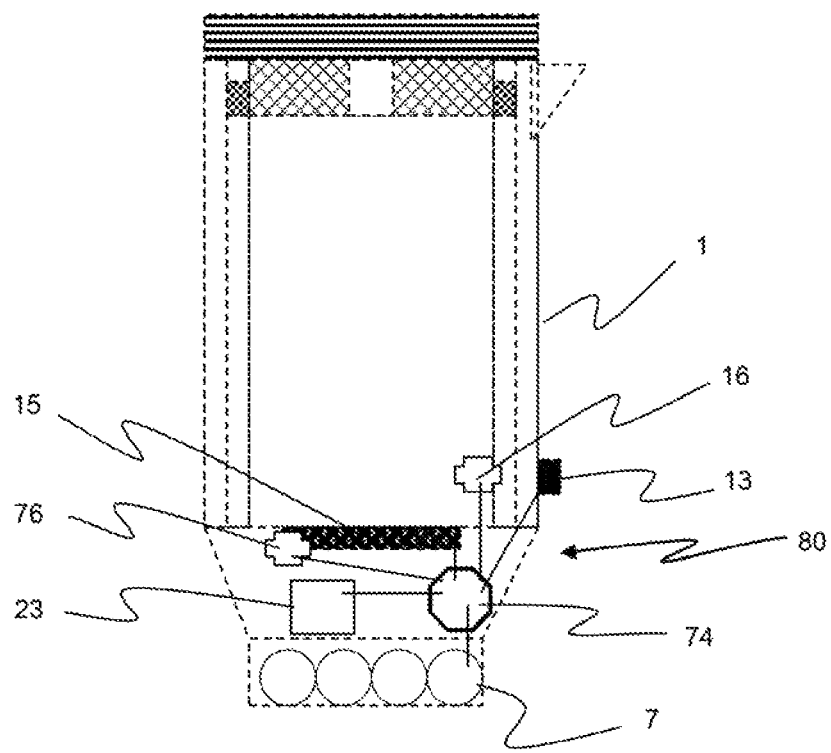

FIG. 14B is a cross sectional view depicting the receptacle of FIG. 14A and a threaded shaft FIG. 15 is a cross sectional side view depicting the portable automatic beverage brewing drinking vessel having control logic.

Figure 16:
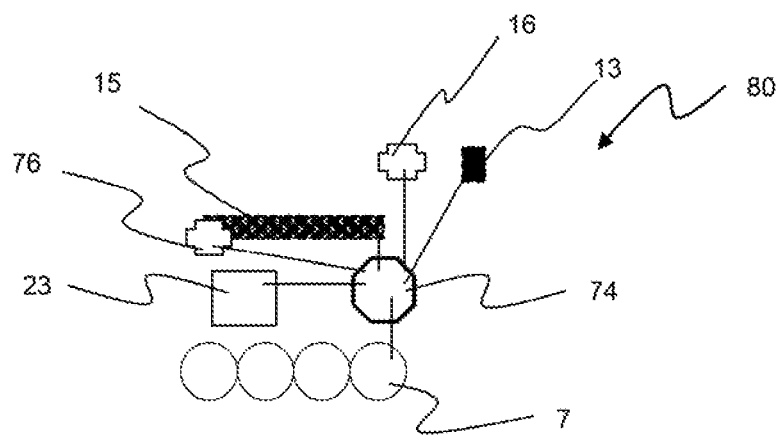

FIG. 16 is a schematic of one embodiment of the control logic.

Figure 17:
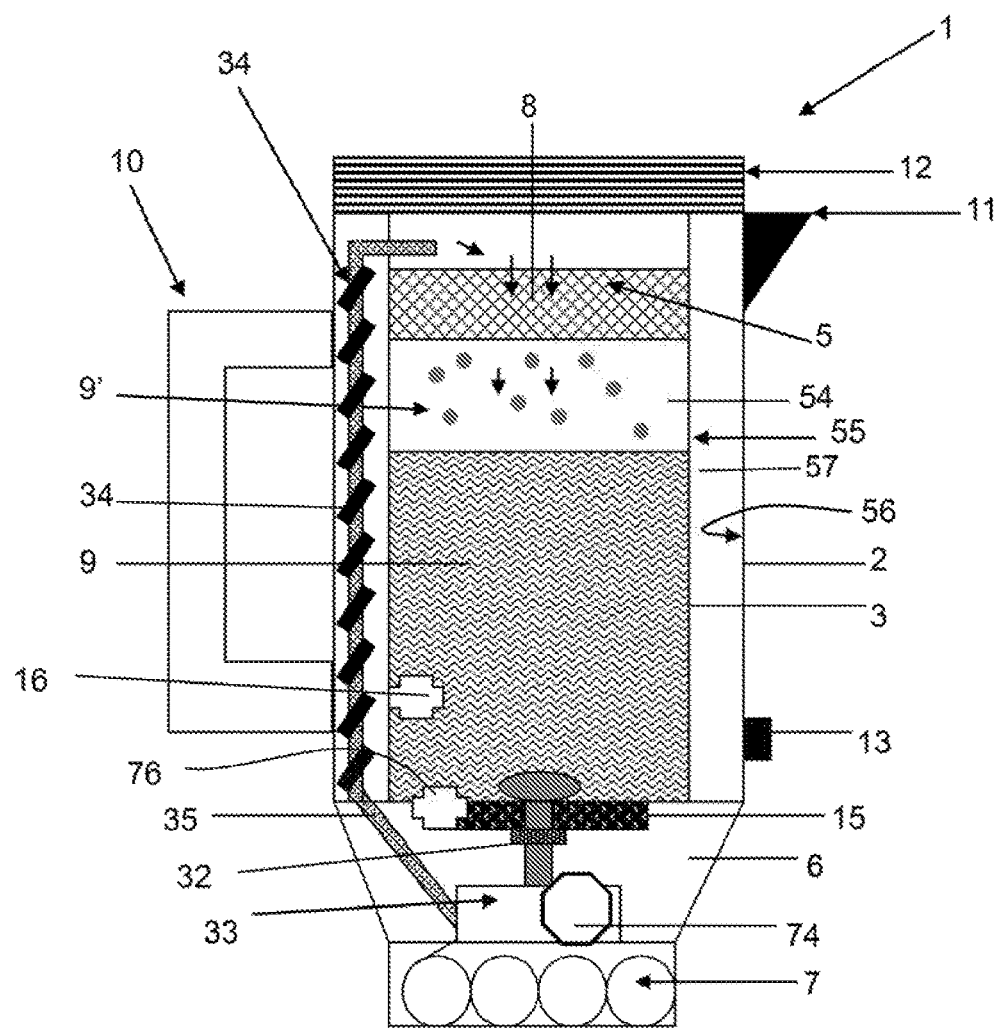

FIG. 17 is a cross sectional side view of the portable automatic beverage brewing drinking vessel having a receptacle for receiving infusible material, and pump to transfer liquid from the vessel to the receptacle.

Figure 18:
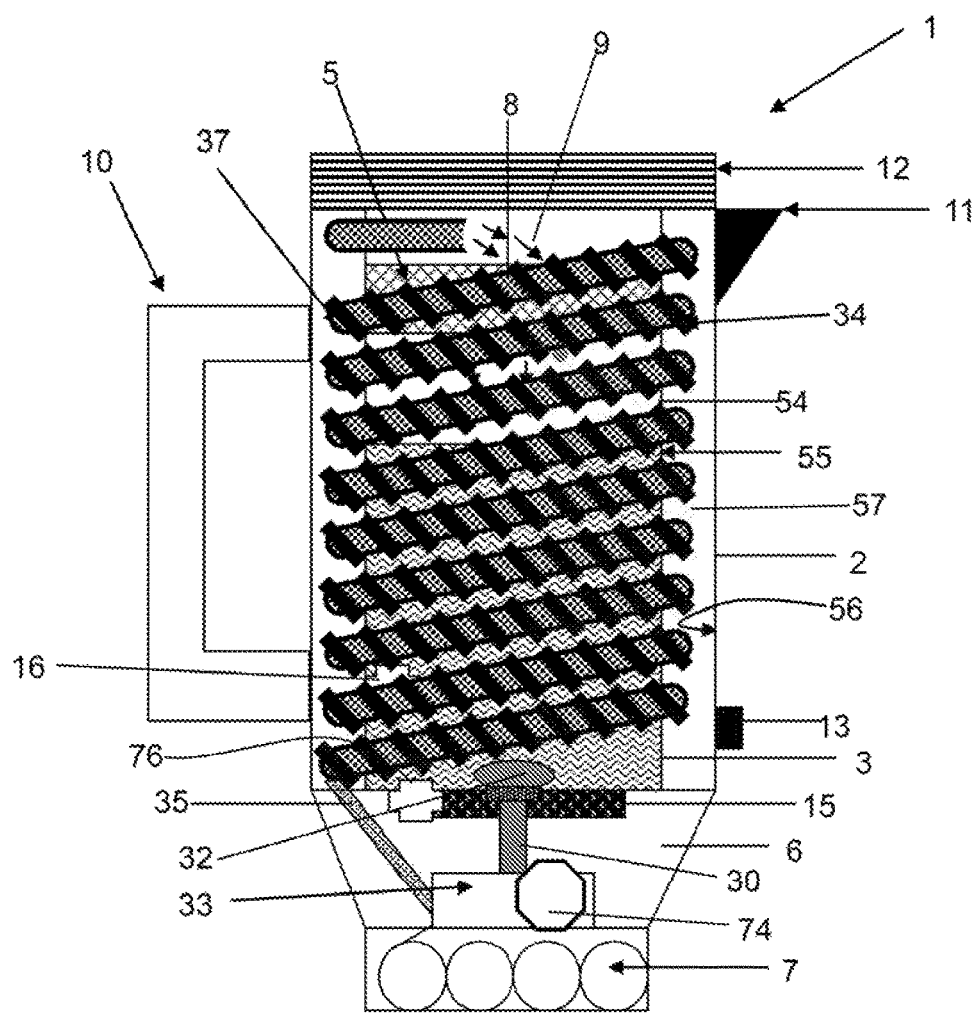

FIG. 18 is a cross sectional side view of the portable automatic beverage brewing drinking vessel having a pump coupled with a tube that spirals around the liquid container and terminated at the receptacle for infusible material.

Figure 19:
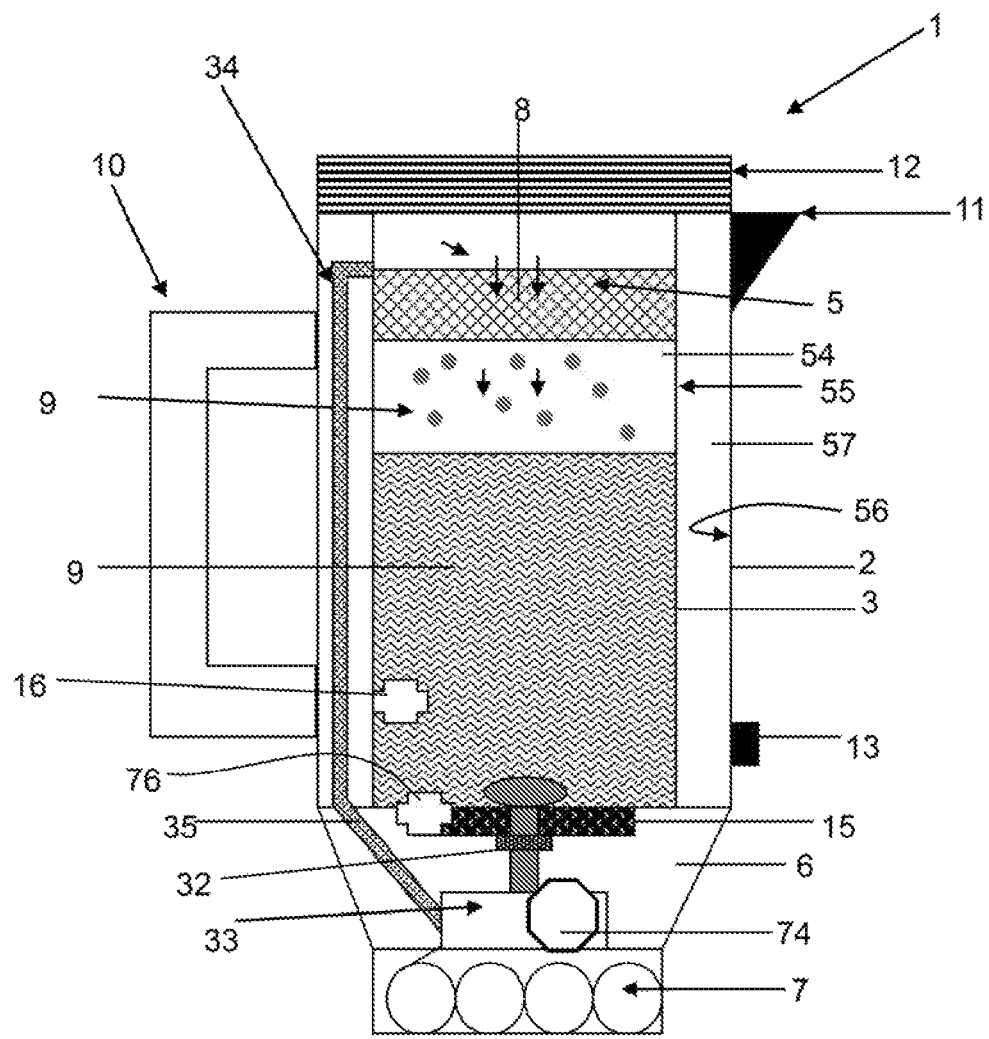

FIG. 19 is a cross sectional side view of the portable automatic beverage brewing drinking vessel having a receptacle for receiving infusible material, a pump to transfer liquid from the vessel, through a tube, to the receptacle.

Figure 20:
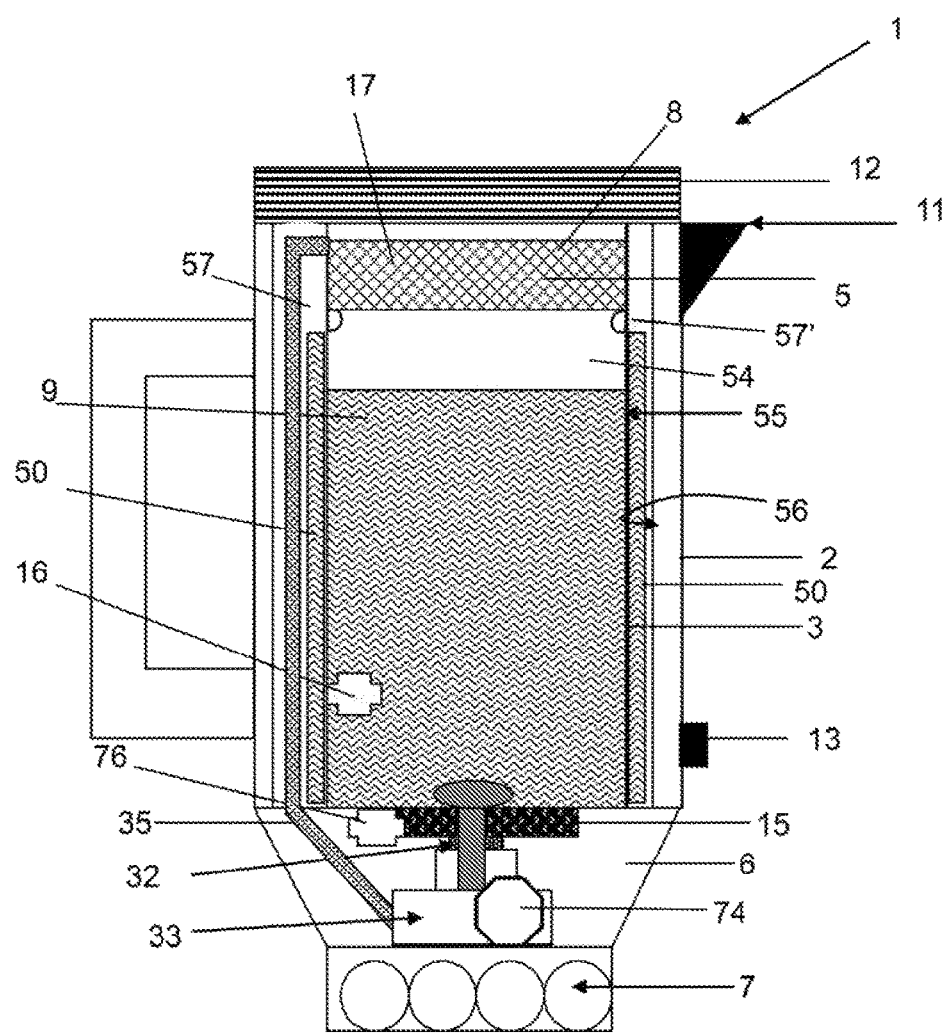

FIG. 20 is a cross sectional side view of the portable automatic beverage brewing drinking vessel having a receptacle for receiving infusible material, a pump to transfer liquid from the vessel, through a tube, to the receptacle and a flexible heating element.

Figure 21:
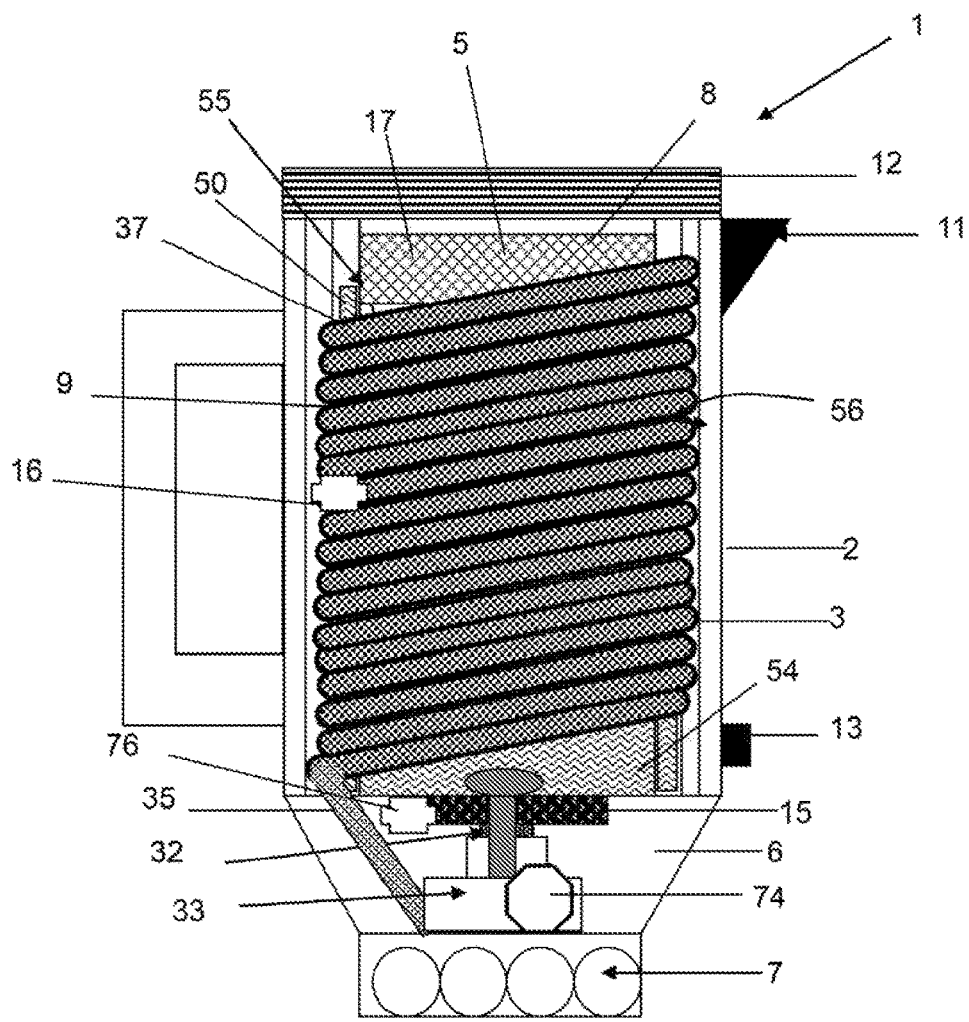

FIG. 21 is a cross sectional side view of the portable automatic beverage brewing drinking vessel having a receptacle for receiving infusible material, a pump to transfer liquid from the vessel, through a spiral tube, to the receptacle and a flexible heating element.

Figure 22:
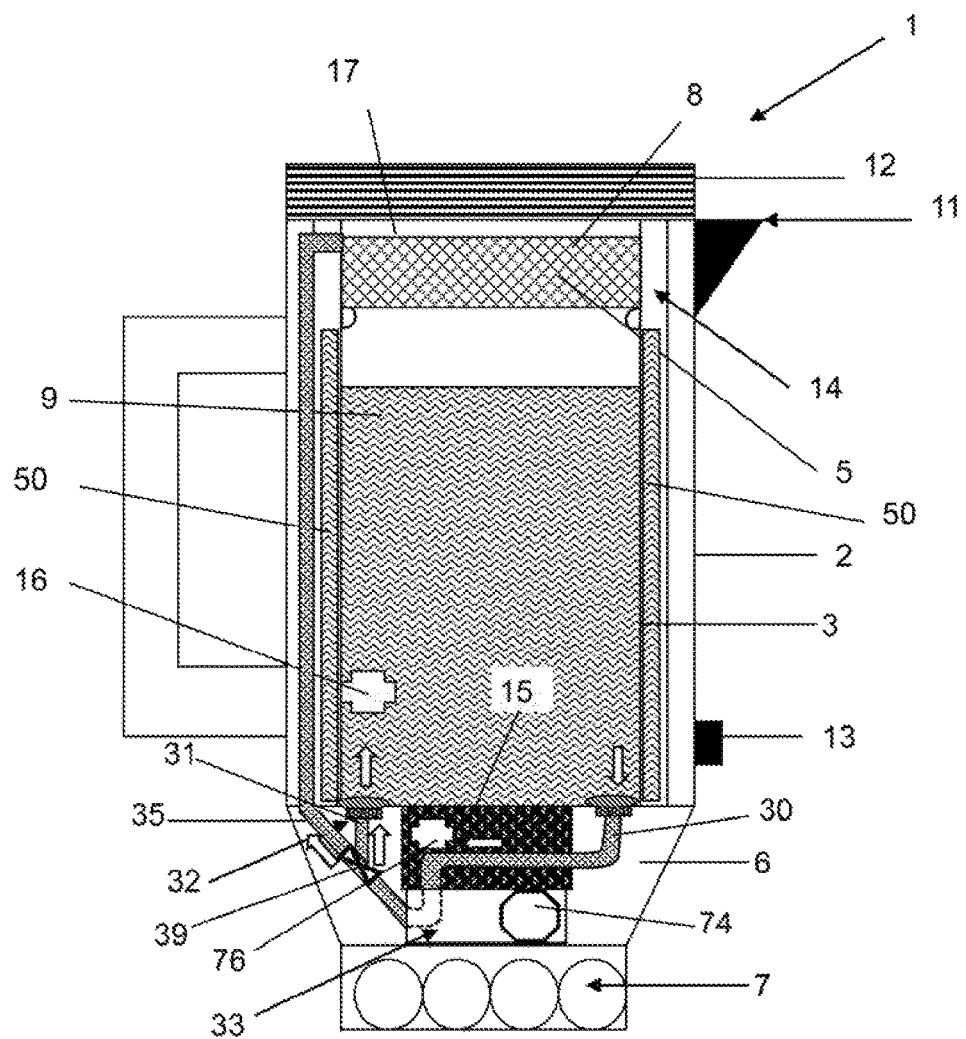

FIG. 22 is a cross sectional side view of the portable automatic beverage brewing drinking vessel having a receptacle for receiving infusible material, a pump configured to circulate liquid from vessel for the purpose of heating it.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

The portable automatic beverage brewing drinking vessel depicted in FIG. 1 comprises a drinking vessel 1 having and exterior wall 2 and interior wall 3 and channels 4 for guiding receptacle 5. In one embodiment, the channels 4 extend from the top portion of the drinking vessel, to the beginning of the base 6 as depicted in FIG. 1. In another embodiment, the channels only extend a portion of the length along the drinking vessel. As depicted in FIG. 1, there are two channels 4 but in other embodiments of the invention, there may be only one channel or multiple channels. The drinking vessel 1 in FIG. 1 has a power supply 7, batteries in the base 6 that are the power supply. The batteries could be any type of battery sufficient to provide enough energy to operate the device, including but not limited to heating the liquid, operating the mechanism for translating the infusible material into the liquid, and operating the control system. The drinking vessel also has a controller 74, as depicted in FIG. 1, that is connected to the power supply 7 and receives input from sensing elements and controls the activation, timing and general operation of the device. The automatic beverage brewing drinking vessel 1 as depicted in FIG. 1 further comprises a handle 10, a drinking port 11 in the lid 12, and an on/off button 13. In addition, the liquid 9 is heated to a predetermined temperature by the heating element 15 that is connected to a temperature sensor 16, as depicted in FIG. 1.

Alignment of the channels 4 with the receptacle guiding elements 14 is depicted in FIG. 2 through FIG. 4, for one embodiment of the invention. FIG. 2 is a top down view of a drinking vessel 1, and the channels 4 are depicted as being positioned across from each other. FIG. 3 shows a receptacle 5 and guiding elements 14. FIG. 4 depicts how channels 4 of the drinking vessel 1 align with the guiding elements 14 of the receptacle 5. The receptacle 5, as shown in FIG. 12, is made of two parts to hold the infusible material 8 and has a hinge 40. In one embodiment, the two parts of the receptacle are hinged. In another embodiment the two parts are configured to snap together or connect to each other through any other conventional means including but not limited to an interference fit snap, or a pin and groove configuration, a threaded configuration that allows the two pieces to be screwed together, and the like. In yet another embodiment, the receptacle consists of only one part that sufficiently retains the infusible material.

FIG. 5 depicts a package of infusible material 8 in a pouch 17 with a sealed edge 18. The infusible material may be coffee grounds, tea, kava kava, mint, or any other material that allows for the extraction of flavors when contacted with water. The pouch is typically made of a material that is porous and allows for the passage of water, while retaining the infusible material inside. In some embodiments, at least a portion of the infusible material passes through the pouch.

FIG. 6 is another embodiment of a package of infusible material 8 in a pouch 17. The pouch 17 as depicted in FIG. 6 has an outer sealed edge 18, an inner sealed edge 20, and an opening 19 in the center of the pouch. In one embodiment the opening 19 is a circle. In another embodiment the opening is rectangular. Any shape opening may be used to facilitate location of the pouch within the receptacle.

FIG. 7 depicts the portable automatic beverage brewing drinking vessel 1 comprising an electrical connection port 21 type power supply. The electrical connection port allows for the portable automatic beverage brewing drinking vessel to be operated by connection to an electrical power supply, such as through an electric cord. The electric connection port may also be used to recharge a battery in the portable automatic beverage brewing drinking vessel, wherein the battery would act as the power supply. The connection port may be configured to receive power through any conventional power cord including but not limited to a wall outlet, an automobile electric output, such as a cigarette lighter and the like. In one embodiment, a multi cell Lithium Ion battery or (LiPo) battery is used to power the device. In another embodiment, the battery is made to be easily removed from the device so that the user can remove the battery after the brewing process in complete in order to reduce the weight of the device.

FIG. 7 further depicts the portable automatic beverage brewing drinking vessel 1 having a lid 12 attached to a hinge 22 for easy removal of the infusible material 8. In addition, a drinking port 11 is depicted in FIG. 7 as a hole in the lid. In another embodiment, the drinking port 11 may be a raised element from the side of the drinking vessel 1 as depicted in FIG. 8.

FIG. 8 depicts the portable automatic beverage brewing drinking vessel 1 comprising an electric motor 23 and a linking mechanism 24 to translate the receptacle 5 into the liquid 9. In FIG. 8, the electric motor 23 is depicted as being in the base 6. Without limiting the design of the linking mechanism, the linking mechanism may be comprised of any conventional elements including but not limited to wires, gears, chains, guide loops, guide channels, pulley and the like. In one embodiment, the electric motor is connected to a wire 25 or wires, and these wires are connected to the receptacle 5 and run through guide loops 26, as depicted in FIG. 8. In another embodiment, the wires may run through guide channels that are part of the portable automatic beverage brewing drinking vessel. In one embodiment, liquid seals 27 are incorporated along the inner edge of the alignment channels 4, as depicted in FIG. 8.

FIG. 9 depicts the portable automatic beverage brewing drinking vessel 1 comprising electromagnets 28 to translate the receptacle 5 into and out of the liquid 9. In this embodiment, the electromagnets are activated through the timing device 29 to cause the receptacle to move down through the liquid after the liquid reaches the preset temperature. A dampener may be used to further control the rate of motion of the receptacle 5 as it moves though the liquid 9, as depicted in FIG. 9. In one embodiment, the electromagnets are only in the base of the portable automatic beverage brewing drinking vessel, and magnets are located in the receptacle.

FIGS. 10A and 10B are cross sectional side views of the portable automatic beverage brewing drinking vessel having a receptacle for receiving infusible material, and an electric motor 23 connected to a threaded center shaft 31 often referred to as a yankee screw, to translate the receptacle 5 through the liquid 9. The threaded center shaft 3, in FIG. 10A and FIG. 10B is connected directly or indirectly to the electric motor 23, and when the motor is activated, after the liquid reaches the preset temperature, turns the threaded center shaft that, through a connection with the receptacle 5, moves the receptacle down into the liquid 9. In this embodiment, a pouch of infusible material 17, as depicted in FIG. 6, may be used to allow the threaded center shaft to move through the receptacle. In addition, as shown in FIG. 10A and FIG. 10B, a seal 32 is placed between the base 6 of the portable automatic beverage brewing drinking vessel and the liquid containment portion of the portable automatic beverage brewing drinking vessel 1. FIG. 10A has a heating element 15 located below the liquid containment vessel or in the base, and FIG. 10B is depicted as having a flexible heating element 50 located outside of the interior wall of the drinking vessel 3. In one embodiment, the flexible heating element is located on the outside surface of the wall containing the liquid, and in yet another embodiment, insulation is positioned between the flexible heating element and the interior side of the exterior wall of the drinking vessel. In one embodiment, multiple flexible heating elements may be used.

FIG. 11 is a cross sectional side view of the portable automatic beverage brewing drinking vessel having a receptacle 5 for receiving infusible material 8, and pump 33 to transfer liquid from the lower portion of the vessel to the infusible material 8. In one embodiment, the liquid 9 may be heated as it is pumped up to the infusible material 8 by heating elements 34 as depicted in FIG. 9. In this embodiment, heating elements are used to heat the tubes which transfer the liquid. Additionally, a seal 32 or seals may be incorporated between the base 6, and the upper portion of the portable automatic beverage brewing drinking vessel, as depicted in FIG. 11.

FIG. 13 is an isometric exploded view of one embodiment of the automatic beverage brewing drinking vessel where a flexible heating element 50 is positioned around the outer surface of the liquid container 54. As depicted in FIG. 13, insulation 52 such as foam, or felt, or aerogel composites, or any other suitable material, or air gaps defined by spacer elements between the outer wall 2 and flexible heating element 50 may be necessary to keep the outer wall 2 of the drinking vessel 1 from becoming too hot. Also shown in FIG. 13 is a two piece receptacle comprising a first piece 82 that is configured to align with a second piece 83. A through hole 84 is configured in both the first piece and second receptacle piece. In addition, guide apertures 88 are configured in both the first and second receptacle pieces to guide the receptacle along the guide elements 89 configured within the liquid container 54, and as shown, along the inner surface of the liquid container. Any suitable shape of guide element and guide aperture may be used and any suitable number including one, two, three, four or more.

FIG. 14A depicts one embodiment of receptacle 5 having a first piece 82 and a second piece 83 with coupling mechanism 86 and through-hole 84 having threads 85 for receiving a threaded center shaft. The two piece receptacle 5 depicted in FIG. 14A has a threaded coupling mechanism, however any type of mechanism that connects the two pieces for holding the infusible material would be sufficient, such as a snap fit, and the like. FIG. 14B is a cross-sectional depiction of the two piece receptacle 5 of FIG. 14A, having a through hole 84 with threads 85 for engaging with the center shaft 31.

The control logic of the present invention comprises a controller connected to a power source that receives input from sensors and activates or initiates the functional components, such as a heating element, electric motor or pump. The controller can be for example a microprocessor chip. The controller may also be indirectly connected to the other components for example; the controller may be connected to an electric switch, which is in turn is connected to a component. FIG. 15, depicts one example of the control logic 80, having a controller 74 connected directly to the two temperature sensors, 16 and 76, an electric motor 23, a heating element 15, and a power supply 7.

FIG. 15 and FIG. 16 depict the control logic 80, and more specifically, the interconnections of components with the controller 74. FIG. 15, depicts one embodiment of the components in relation to the drinking vessel land FIG. 16 more dearly shows how the components might be connected. The controller 74 is connected to the power supply 7 and controls the operation of the automatic beverage brewing drinking vessel 1, including but not limited to receiving input from the on/off button 13, liquid temperature sensor 16, heating element temperature sensor 76, and controlling when components of the drinking vessel are activated including but not limited to the heating element 15, and motor 23, as depicted in FIGS. 15 and 16. The controller may be directly or indirectly connected with the input and output functions of the device. The drinking vessel is envisioned to be completely automatic, in that the user simply has to fill the vessel with liquid, such as water, load the infusible material, and press the "on" button, which activates the controller to begin the automatic brewing process.

In one embodiment, the portable automatic beverage brewing drinking vessel of the present invention is unitary, meaning that the vessel contains all parts and components necessary to brew a beverage and that the drinking vessel is not removed from any component, such as a heating element, and no component is required to be removed from the drinking vessel during the brewing process, or before, or during consumption of the beverage directly from the vessel. With conventional brewing devices, the pot or vessel is removed from the brewing device and the brewed beverage is poured into a separate drinking vessel. The drinking vessel of the present invention is an integral part of the brewing device. The user simply has to insert the infusible material into the receptacle and activate the automatic beverage brewing drinking vessel to being brewing, and after the automatic brewing sequence is complete, the user may drink directly from the vessel. In one embodiment an electric cord may be connected to the automatic beverage brewing drinking vessel to charge the batteries or to supply power, and in this embodiment, it may be more convenient for the user to remove the cord from the vessel prior to consuming the beverage.

As shown in FIG. 17, a drinking vessel 1 comprises a receptacle 5 for receiving infusible material 8, a pump 33 to transfer liquid from the lower portion of the vessel to the infusible material 8. In this embodiment, the pump is coupled with a tube 35 that has a heating element 34 configured around the tube. The tube extends between the exterior 55 of the liquid container 54, and the interior of the exterior wall 2. The tube extends up along the inner space 57 between the exterior wall 2 and the liquid container 54. The tube comprises a heating element 34 that is configured around the tube within this inner space 57. The liquid 9 is pumped from the liquid container 54 through the tube 35 where it is directed to the infusible material. The tube may terminate above the receptacle for infusible material 5 where liquid may be dispersed over the infusible material. The heated liquid may then pass through the infusible material to provide a brewed beverage. In one embodiment, the tube may terminate on the side of the receptacle 5 and the top of the receptacle 5 may be configured to uniformly disperse the liquid over the infusible material 8. The top of the receptacle may comprise a plurality of apertures, holes, slits and the like to disperse the liquid down over the infusible material.

As shown in FIG. 18, a drinking vessel 1, as described herein, has a pump 33 configured in the base 6. The pump is coupled with a conduit 30 from the liquid container 54. A seal 32 prevents liquid 9 from leaking from the liquid container about the conduit 30. A tube 35 is couple to the pump and has a spiral tube 37 portion configured around the liquid container 54, or wrapped around the container. The liquid within the tube may be heated as it is pumped through the spiral portion of the tube. As shown in FIG. 18, a heating element 34 is configured around the spiral portion of the tube 37. The tube may be configured to hold a volume of liquid to substantially fill the liquid container for providing a beverage. The tube 35 may have an interior volume that will fill the liquid container at least half way, or half the full volume of the liquid container, at least three quarters, or substantially up to the bottom of the receptacle, or substantially fill the container. In this way, the liquid can be pumped from the liquid container, heated, and pumped back into the liquid container without pumping liquid that has been exposed to the infusible material. The volume of the liquid container portion of the portable automatic beverage brewing drinking vessel is described herein. The spiral tube is configured in the inner space 57 between the exterior of the liquid container 55 and the interior of the exterior wall 56. An insulation material may be configured between the spiral tube and the exterior wall 2 of the drinking vessel 1.

As shown in FIG. 19, a portable automatic beverage brewing drinking vessel 1 has a receptacle 5 for receiving infusible material 8, a pump 33 to transfer liquid from the liquid container 54, through a tube 35, to the receptacle 5. The tube 35 terminates at the edge or side of the receptacle, such as just above the top of the receptacle, and the top of the receptacle has a plurality of apertures for dispensing the liquid over the infusible material 8.

As shown in FIG. 20, the portable automatic beverage brewing drinking vessel 1 has a receptacle 5 for receiving infusible material 8, a pump 33 to transfer liquid from the liquid container 54, through a tube 35, to the receptacle. A flexible heating element 50 is configured on the exterior of the liquid container and inside of the exterior wall 2. As shown in FIG. 20, the flexible heating element is configured inside of the tube 35, but may be configured outside of the tube or tubes, or two flexible heating elements may sandwich the tube or tubes. For example, a spiral tube may be configured between a flexible heating element configured on the inside of the tube, or along the exterior surface of the liquid container and a flexible heating element may be configured outside of the spiral tube, or along the interior of the exterior wall 56. This configuration may produce effective heating of the liquid as it is pumped to the receptacle. As shown in FIG. 20, there is a heating element 15 configured to heat the bottom surface of the liquid container 54. In one embodiment, heating element 15 and/or 50 may be heated to increase the temperature of the liquid 9 within the liquid container. When the liquid reaches a desired, or preset temperature, the controller 74 may turn on the pump 33 to pump the heated liquid up to the receptacle. It is to be noted that the inner space 57 is larger in the area of the tube 35 than the inner space 57' shown having no tube configured therein. The inner space may be configured with tubes, heating elements, and insulation, for example.

As shown in FIG. 21, the portable automatic beverage brewing drinking vessel 1 has a receptacle 5 for receiving infusible material 8, a pump 33 to transfer liquid 9 from the liquid container 54, through a spiral tube 37, to the receptacle. A flexible heating element 50 is configured inside of the spiral tube 37. Note that the spiral tube may be configured in any suitable type of spiral configuration. As shown in FIG. 21, the spiral tube is configured with substantially no space between the discrete spiral tube 37 wraps. The spiral tube wraps may contact each other like a compressed spring, for example, whereby by one wrap of spiral tube contacts the preceding and proceeding wraps. This configuration may increase the volume of liquid the spiral tube can hold, and may increase the resonance time of the liquid within the tube for effective heating of the liquid before it is dispensed into the receptacle. Furthermore, a spiral tube may act as an insulator after the liquid is pumped therethrough, as the spiral tube contains a pocket of air, which would insulate the exterior of the drinking vessel. In the embodiment shown in FIG. 21, the liquid 9 within the liquid container 54 may be pumped out of the liquid container until the liquid fills the spiral tube, at which point, the pump may turn off so that the liquid within the tube can heat to a pre-set temperature. A sensor 16 may monitor the temperature of the liquid within the tube or a temperature related to the temperature of the liquid within the tube, such as the exterior temperature of the tube. When the temperature reaches a preset value, the pump may then turn back on to dispense the liquid within the tube into the receptacle.

As shown in FIG. 22, the portable automatic beverage brewing drinking vessel 1 has a receptacle 5 for receiving infusible material 8, a pump 33 configured to circulate liquid 9 from liquid container 54 for the purpose of heating it. A conduit from the liquid container to the pump 33 is configured to be heated by heating element 15. The pump may then pump the heated liquid back into the liquid container through a conduit from the pump to the liquid container 31. This recirculation of liquid from the liquid container may be used to heat the liquid to a desirable or preset temperature. After a sensor 16, for example, indicated to the controller 74 that the preset temperature has been reached, a valve 39 may direct liquid from the pump, through tube 35 to the receptacle.

It is to be understood that any suitable combination of heating elements, tubing configurations and heating methods of the liquid may be used in any way in the present invention.

Definition of Terms Used Herein

As used herein, the term automatic means that the portable automatic beverage brewing drinking vessel performs functions to brew the beverage without the intervention of the user. For example, the portable automatic beverage brewing drinking vessel heats the liquid to a predetermined temperature and translates the infusible material into the liquid.

As used herein, the term translating means that the receptacle for receiving infusible material moves for example up and down. Furthermore, when brewing the beverage, the receptacle is translated down and the liquid permeates through the receptacle causing the liquid to come in contact with the infusible material.

As used herein, the term portable means that the portable and automatic beverage brewing device consisting of a unitary drinking vessel comprising a plurality of components configured to brew a beverage therein, can be easily carried in one hand, a beverage can be consumed directly therefrom, and in one embodiment, the power supply to operate the vessel is contained within the device housing.

As used herein, the term beverage means any beverage that a person may drink.

As used herein, the term brewing means extracting flavor from a material through the process of exposing the said material to liquid. For example, flavor is extracted from coffee, an infusible material, by exposing the coffee to liquid at elevated temperatures.

As used herein, the term heating element means an electrically powered resistive device that heats liquid to a predetermined temperature.

As used herein, the term drinking vessel means a container that is specifically design for the purpose of consuming a beverage directly from. In one embodiment, the volume of the portable automatic beverage brewing drinking vessel is less than 0.75 liters, in another embodiment the volume is less than 0.5 liters and in yet another embodiment the volume is between 0.25 liters and 0.5 liters. In one embodiment, the lid 12 in FIG. 1 may be designed with a drinking port 11, such that the contents of the portable automatic beverage brewing drinking vessel 1 can be consumed through the drinking port 11. In another embodiment, the drinking port 11 as depicted in FIG. 8 through FIG. 11, allows the contents of the portable automatic beverage brewing drinking vessel to be consumed through the raised section on the side. As depicted in FIG. 1, the liquid container for has a volume for receiving liquid and can further be defined by a vertical axis 92. The receptacle may be moved down into the liquid some depth along this vertical axis. The depth may be defined as the distance along the vertical axis from the top portion of the liquid container, to some distance down from this position.

As used herein, the term base means the portion of the portable automatic beverage brewing drinking vessel below the liquid reservoir. In an embodiment, the moving mechanism is at least partially contained within the base along with a heating element, control logic, and portable electric power such as batteries or an electric port.

The portable automatic beverage brewing drinking vessel of the present invention is easily operated by filling the vessel to a desired level with water or other liquid and then placing a quantity of infusible material 8 into the into the receptacle 5, as depicted in FIG. 1 and FIG. 7 through FIG. 11. In one embodiment, the receptacle is designed to have two parts so that the infusible material can be easily placed into and restrained in the receptacle. In one embodiment, the receptacle 5 further comprises a hinge 40 as depicted in FIG. 12. In one embodiment, the infusible material is placed directly into the receptacle, and the receptacle is designed with a perforated material that will contain at least in part the infusible material throughout the brewing process. In a preferred embodiment the infusible material is in a pouch, and the pouch further contains the infusible material during brewing process. The pouch is advantageous because the quantity of infusible material is pre-measured and keeps the infusible material from spilling during loading and removal.

After the portable automatic beverage brewing drinking vessel 1 is filled to a desired level with water and the infusible material 8 is placed in the receptacle, the user simply has to activate the on/off switch 13, as depicted in FIG. 1 and FIG. 7 through FIG. 11. The portable automatic beverage brewing drinking vessel then heats the water to a preset temperature. In one embodiment, the liquid temperature is measured with a temperature sensor, and when the liquid reaches this preset temperature, the portable automatic beverage brewing drinking vessel automatically activates the lowering of the receptacle into the liquid. There are many different means for translating or lowering the receptacle into the liquid. In one embodiment, the means for moving the receptacle into the liquid is an electrical motor connected to wires that are connected to the receptacle. When activated, the motor is switched on to lower the receptacle into the liquid as depicted in FIG. 8. In another embodiment, the electric motor is connected to a threaded center shaft that will interact with receiving threads 85 on the receptacle 5, as depicted in FIG. 10A and FIG. 10B.

In another embodiment, the means for lowering the receptacle into the liquid is electromagnets as depicted in FIG. 9. In this embodiment, the electromagnets are positioned such that when activated, the magnets are attracted to each other and the receptacle is translated down through the liquid. In one embodiment, at least one electromagnet is connected to the receptacle, in another embodiment, the at least one electromagnet is located in the base, in yet another embodiment, an electromagnet is located in the base and a magnet is located in the receptacle.

In yet another embodiment, as depicted in FIG. 11, after the portable automatic beverage brewing drinking vessel 1 is filled and turned on, a pump is thereafter activated to transfers the liquid 9 through a tube 35 to the infusible material 8. The tube or conduit for transferring the liquid may be any conventional tube suitable of transferring liquid, such as but not limited to plastic or metal tubing. In one embodiment, the pump is activated after the liquid reaches a preset temperature. In another embodiment, the pump is activated after the portable automatic beverage brewing drinking vessel is turned on and the liquid is at least partially heated through heating elements placed in proximity to the liquid transfer tube.

EXAMPLE

The portable automatic beverage brewing drinking vessel is first filled to a desired level with water. A pre-package pouch of ground coffee is placed in the receptacle and the lid is closed. The portable automatic beverage brewing drinking vessel is manually activated to the on position and this sends a signal to the controller, and the controller activates the heating element. The controller receives a signal from the liquid temperature sensor and also from the heating element sensor while the liquid is being heated. If the heating element becomes too hot, the controller will reduce or stop current to the heating element thereby reducing the chance for overheating. The temperature sensor monitors the temperature of the liquid and when it reaches the preset temperature, the control logic, and specifically the control, activates the motor to turn, which engages the threaded center shaft to lower the receptacle containing the coffee into the liquid. After a preset time the receptacle is automatically raised up within the vessel. The user can then remove the receptacle or the contents of the receptacle and drink the beverage directly from the portable automatic beverage brewing drinking vessel.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A portable and automatic beverage brewing device configured in a unitary drinking vessel comprising a plurality of components including:
   a single liquid container having an interior surface, an exterior surface, and a volume;
      wherein the single liquid container is configured within the unitary drinking vessel;
   a base configured under said liquid container,
   a heating element;
   a receptacle for receiving infusible material located in the volume of the liquid container;
   a pump;
   at least one conduit extending from said pump;
   a controller;
      a power supply connected to the heating element, the pump and the controller;
      a drinking port; and
      an inner space between the exterior surface of the liquid container and an exterior wall of the unitary drinking vessel;
         wherein the at least one conduit extends from the pump, along said inner space to the receptacle for receiving infusible material;
         wherein the heating element is configured within the inner space between the exterior surface of the liquid container and the exterior wall of the unitary drinking vessel;
   wherein unitary means that said plurality of components are attached to said drinking vessel,
   wherein said base is attached to and part of said unitary drinking vessel, and
      wherein said pump pumps liquid contained within said liquid container to said receptacle through said conduit thereby brewing a beverage for consumption directly from said unitary drinking vessel from said drinking port;
      wherein the pump is configured in the base;
      wherein the at least one conduit comprises a spiral conduit that spirals around the exterior surface of the liquid container a portion of a distance between the base and the receptacle for receiving infusible material;

wherein the at least one conduit is heated in the inner space by the heating element; and wherein the conduit is in contact with the heating element to heat the liquid.

2. The portable and automatic beverage brewing device of claim 1, wherein the heating element is planar and extends around the liquid container.

3. A portable and automatic beverage brewing device of claim 1 wherein said base is attached to and part of said unitary drinking vessel, wherein the controller is configured to pump the liquid into said conduit and then turn-off said pump until a preset temperature of the liquid is reached, at which point the controller turns the pump back on to pump the liquid contained within the conduit to the receptacle.

4. The portable and automatic beverage brewing device of claim 1, wherein the heating element is planar and extends around a portion of the liquid container.

5. The portable and automatic beverage brewing device of claim 4, wherein the heating element is a flexible heating element in contact with a portion of the exterior surface of the liquid container.

6. The portable and automatic beverage brewing device of claim 4, wherein a first heating element is configured within the inner space and a second heating element is configured in the base.

7. The portable and automatic beverage brewing device of claim 1, wherein the heating element is configured around said conduit between the base and the receptacle for receiving infusible material.

8. The portable and automatic beverage brewing device of claim 1, wherein a first conduit extends between the liquid container and the pump and is heated by said heating element and a second conduit extends from the pump to the receptacle, and wherein said heating element heats liquid as it is circulated by said pump from the liquid container through said first conduit back to the liquid container.

9. The portable and automatic beverage brewing device of claim 1, wherein said controller and power supply are configured in the base.

10. The portable and automatic beverage brewing device of claim 1, wherein the liquid container holds no more than 0.75 liters.

11. The portable and automatic beverage brewing device of claim 1, wherein the drinking port is configured proximal to a top of the drinking vessel, for consumption of a beverage brewed in said portable and automatic beverage brewing device and wherein said portable and automatic beverage brewing device can be carried as a single unit.

12. A method of brewing a beverage for consumption directly from a unitary drinking vessel comprising the steps of:

a. providing a portable and automatic beverage brewing device as described in claim 1;

b. pouring liquid into said liquid container;

c. placing an infusible material into said receptacle for receiving infusible material;

d. turning on said portable and automatic beverage brewing device;

whereby turning on said portable and automatic beverage brewing device activates said heating element to heat said liquid poured into said container to provide a heated liquid, and whereby turning on said portable and automatic beverage brewing device activates said pump to pump said heated liquid through said at least one tube to said receptacle where said heated liquid contacts said infusible material to provide a brewed beverage, e. drinking said brewed beverage directly from said unitary drinking vessel.

13. The method of brewing a beverage for consumption directly from a unitary drinking vessel of claim 12, whereby said liquid is heated to a preset temperature to provide a heated liquid, before said heated liquid is pumped through the at least one tube to the receptacle for receiving infusible material.

14. The method of brewing a beverage for consumption directly from a unitary drinking vessel of claim 12, wherein the pump is configured in the base and the at least one tube extends from the pump along an inner space between the exterior surface of the liquid container and the exterior wall of the unitary drinking vessel.

15. The method of brewing a beverage for consumption directly from a unitary drinking vessel of claim 14, wherein the at least one tube comprises a spiral tube.

16. The method of brewing a beverage for consumption directly from a unitary drinking vessel of claim 12, wherein a heating element is configured within an inner space between the exterior surface of the liquid container and the exterior wall of the unitary drinking vessel.

* * * * *